Jan. 7, 1969 P. HOLZMANN 3,420,045
MACHINE FOR PICKING BERRIES AND THE LIKE
Filed June 28, 1966 Sheet 1 of 4
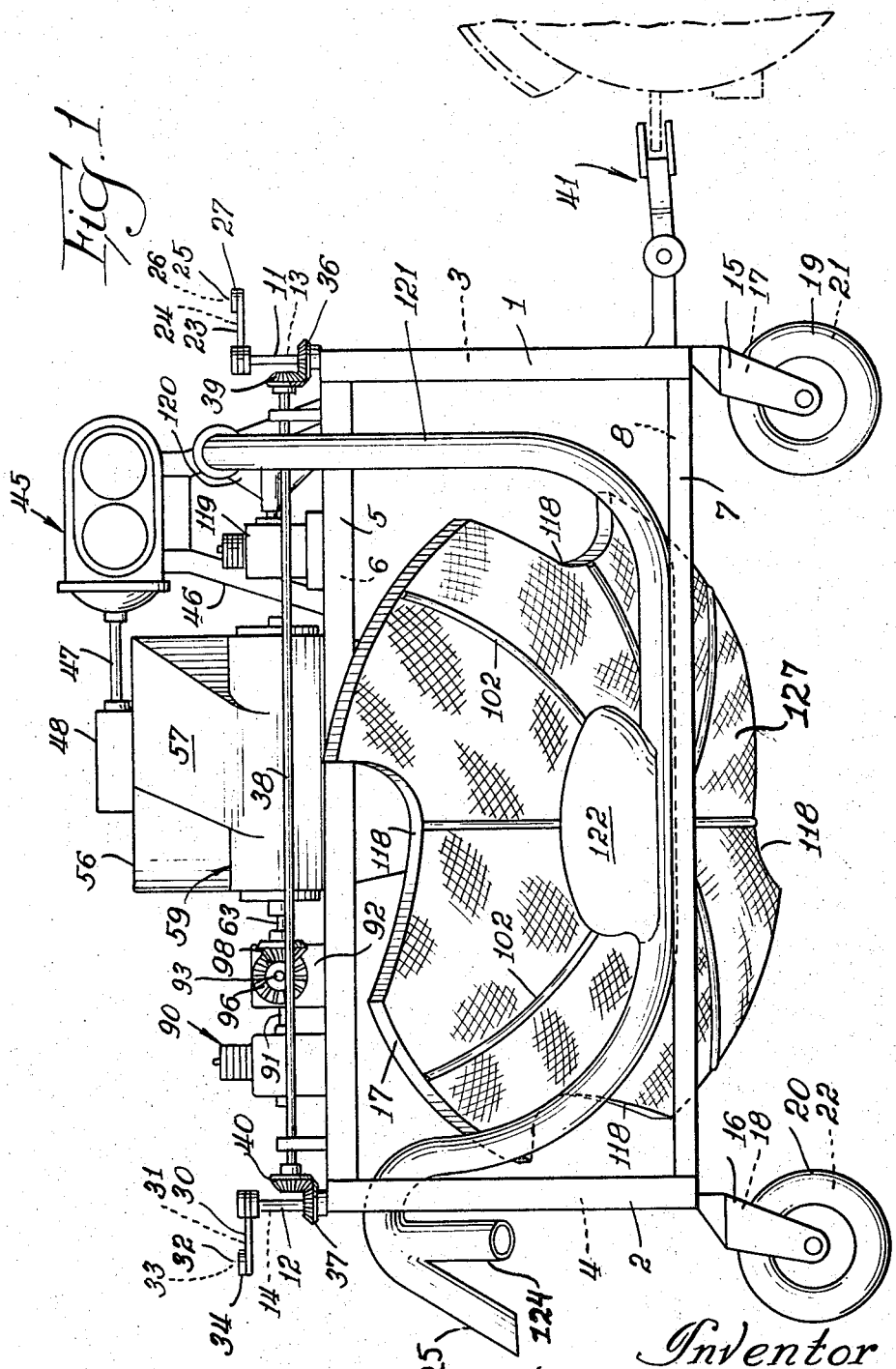
Inventor
Paul Holzmann
By Hueschen and Kurlandsky
Attys.

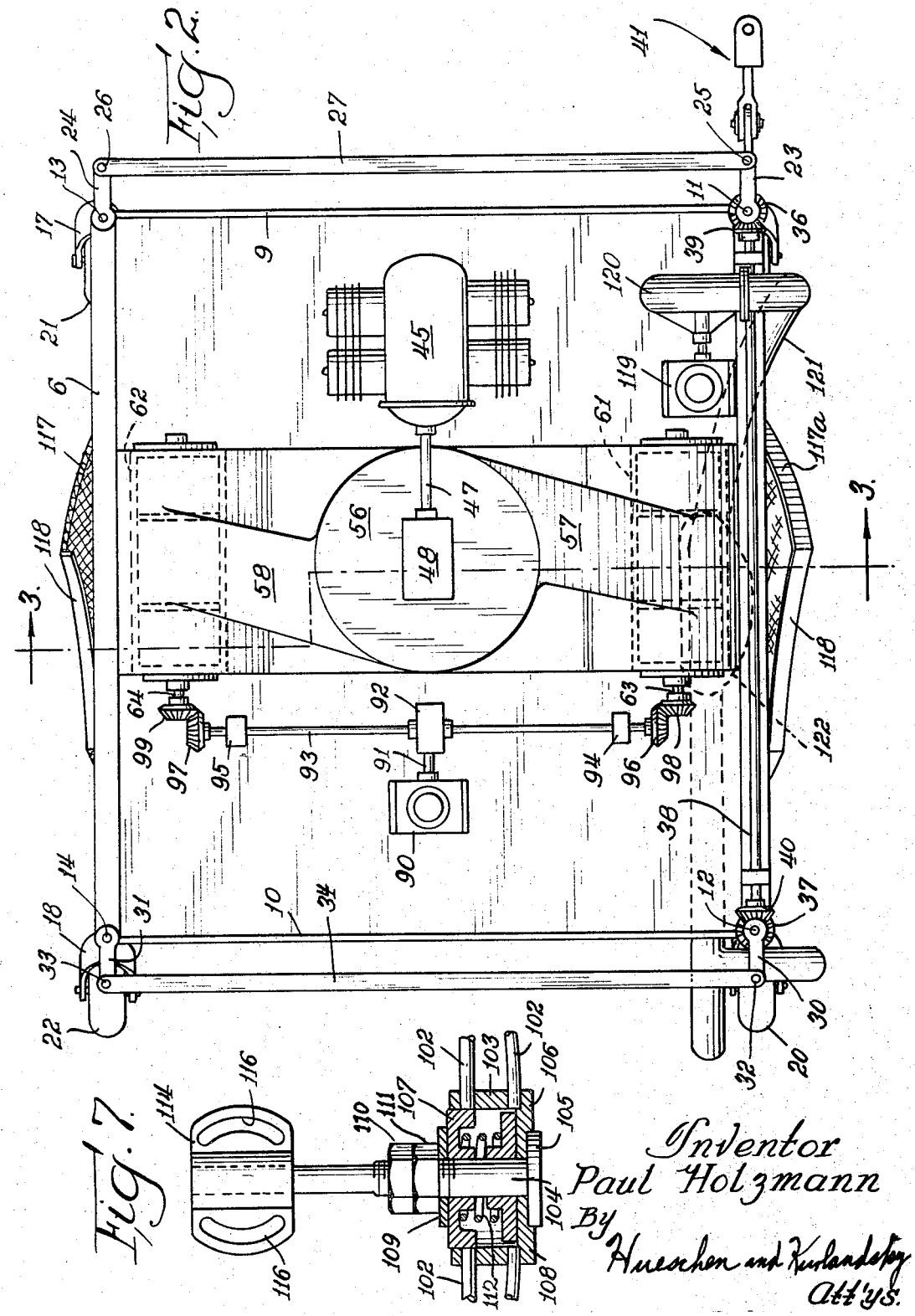

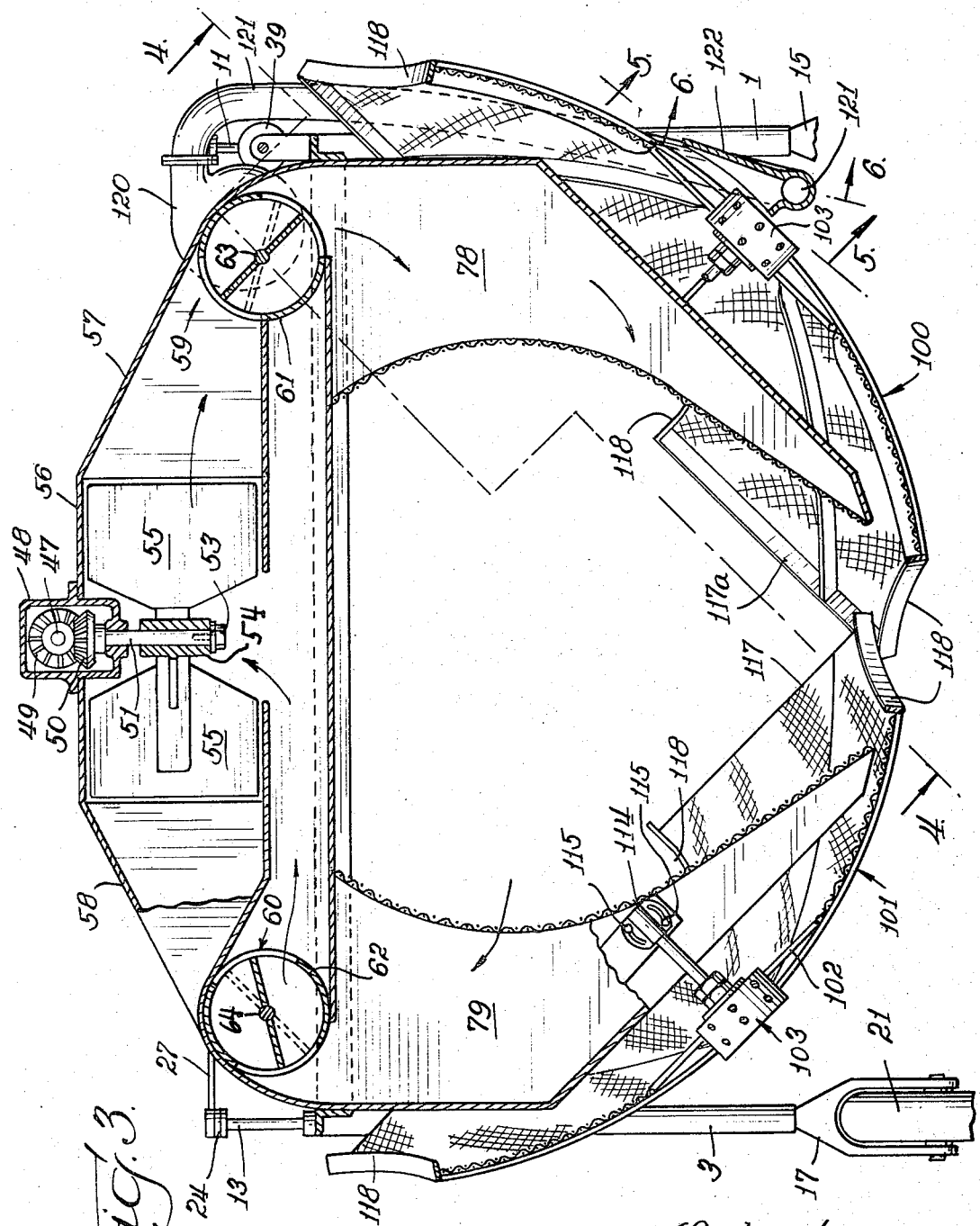

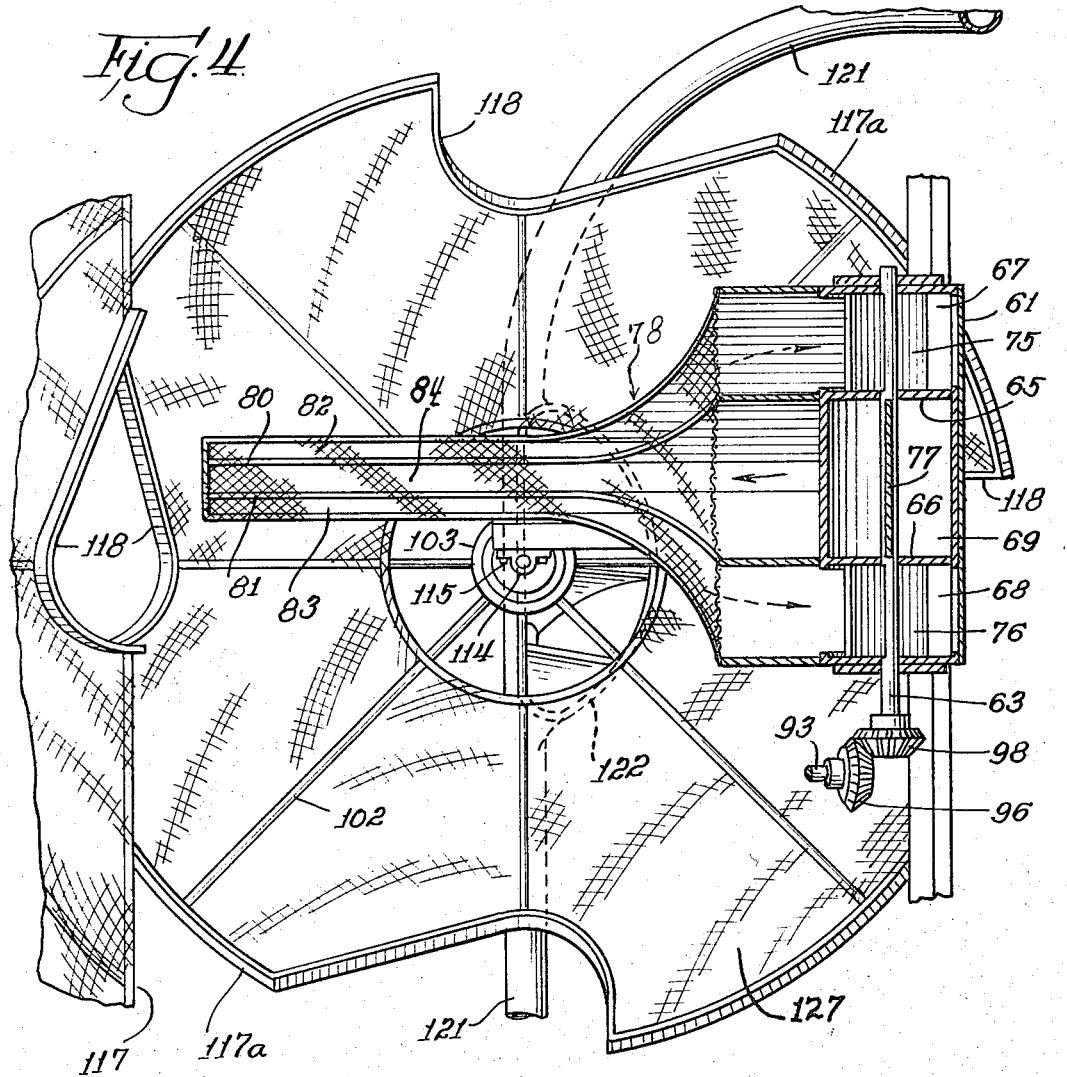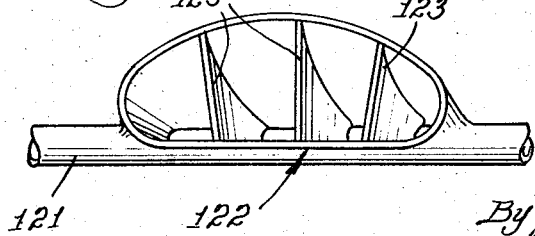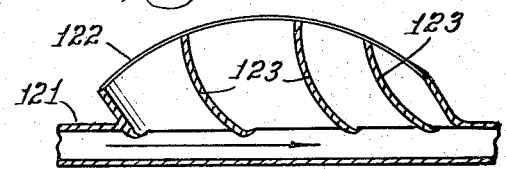

United States Patent Office 3,420,045
Patented Jan. 7, 1969

3,420,045
MACHINE FOR PICKING BERRIES
AND THE LIKE
Paul Holzmann, 76th St. S., R.R. 3, Box 151,
South Haven, Mich. 49090
Filed June 28, 1966, Ser. No. 561,102
U.S. Cl. 56—330                               10 Claims
Int. Cl. A01g 19/00

The present invention relates to berry and fruit picking apparatus, and is more particularly concerned with a machine for picking berries and particularly delicate and fragile berries such as blueberries which grow on linearly aligned bushes.

Machines have been developed in the prior art which are capable of picking fruit and berries, including blueberries, from trees and bushes. Such prior art devices generally are provided with mechanical means which physically engage and shake the branches of the tree or bush thereby knocking off the fruit or berries which are subsequently caught by a suitable device. However, such devices have the disadvantage that they tend to damage the trees and bushes, as well as the fruit and berries. Moreover, such machines are difficult to control with precision and generally overstrip the vegetation of all fruit and berries, both ripe and unripe. Consequently, such machines cannot be used until the end of the season when only a small amount of unripe fruit and berries remain. Moreover, prior art machines of the type described are exceedingly expensive and are generally used only by the large producer. Other types of fruit and berry picking machines have been developed but have not proved to be practical for a number of reasons.

It is an object of the present invention to provide a machine for picking fruit and berries which accomplishes the objective without damaging either the bushes and trees, or the fruit and berries. It is a further object to provide a machine of the type described which in picking is able to distinguish between ripe products to be picked and unripe ones which are to be left on the tree or bush. It is a further object of the invention to provide improved means for catching the fruit and berries which are removed from the trees and bushes, including conveying means to transport the picked product to a proper receptacle. It is an additional object to provide such an apparatus which separates the produce from contaminants such as leaves, branches, and soil which may be picked up. It is still a further object to provide a machine for picking produce which is relatively simple to construct and is not economically prohibitive for use by small volume growers. The accomplishment of the foregoing and additional objects will become more fully apparent hereinafter.

The invention in its preferred embodiment is illustrated by the accompanying drawings in which:

FIG. 1 is a side elevational view of a machine according to the invention.

FIG. 2 is a top view of the apparatus of FIG. 1.

FIG. 3 is a cross-sectional view taken at the line 3—3 of FIG. 2.

FIG. 4 is a top fragmentary view partially in cross-section illustrating the produce catching device and valving system, taken at the line 4—4 of FIG. 3.

FIG. 5 is a perspective view showing a duct outlet, taken at the line 5—5 of FIG. 3.

FIG. 6 is a cross-sectional view of the duct outlet of FIG. 5 taken at the line 6—6 of FIG. 3, and FIG. 7 is a fragmentary cross-sectional view illustrating a hub upon which the baskets of the invention are mounted.

According to the invention, an improved machine for picking fruit and berries is provided comprising a drawn carriage adapted to straddle the trees or bushes the fruit of which is to be picked. Blower means is mounted on the carriage and adapted to provide simultaneously air pressure and air vacuum. A pair of air ducts lead from the blower to each side of the chamber defined by the apparatus and having duct outlets. A valve means is provided in the duct system for rapidly and alternatively applying an air pressure or air vacuum to each duct, the valve system being so programmed that when air pressure is applied to the duct on one side, air vacuum is applied to the duct on the other. As a result an oscillating air blast is established in the chamber which causes bushes or trees positioned within the chamber to be shaken with a predetermined force and frequency until the ripe fruit or berries have shaken off. The produce is caught in a pair of circular nets which surround the base of the tree or bush and is subsequently introduced into an air pressure conveying duct which removes foreign matter and debris and transports the product to a suitable receptacle.

Reference is now made to the accompanying drawings for a better understanding of the invention, wherein all the parts are numbered and wherein the same numbers are used to refer to the same parts throughout.

Referring to the drawings, the carriage frame comprises four tubular vertical posts 1, 2, 3, and 4, upper longitudinal frame members 5 and 6, lower longitudinal frame members 7 and 8, and upper transverse frame members 9 and 10. Vertical shafts 11, 12, 13, and 14 are journaled in the axial channels of the vertical posts 1, 2, 3, and 4, respectively. The lower ends of the shafts have wheel housings 15, 16, 17, and 18 affixed thereto. Wheels 19, 20, 21, and 22 are rotatably mounted on axles supported in the wheel housings. The front wheels 19 and 21 are coupled together by radius rods 23 and 24 affixed at one end to the shafts 11 and 13, respectively. The other ends of the radius rods are provided with pins 25 and 26 journaled through holes in a tie rod 27. The wheels 20 and 22 are coupled together by means of radius rods 30 and 31 affixed at their ends to the shafts 12 and 14, respectively, and being provided with pins 32 and 33 journaled in holes provided in the ends of a tie rod 34. Miter gears 36 and 37 are also affixed to the shafts 11 and 12, respectively. The gears are coupled by means of a rotatably mounted shaft 38 having a miter gear 39 affixed at one end thereof and engaging the miter gear 36, and a miter gear 40 affixed to the other end of the shaft and engaging the miter gear 37. As a result of the arrangement, when the front wheels 19 and 21 are turned clockwise by means of a hitch 41 affixed to the tie rod 23, the wheels 20 and 22 are caused to turn counterclockwise, thereby reducing the turning radius of the carriage and facilitating its maneuverability.

The apparatus for providing a reciprocating air blast comprises a combustion engine 45 mounted to the frame of the carriage by means of a mounting bracket 46. The engine is provided with a shaft 47 having one end extending into a gear housing 48 and having a miter gear 49 affixed to its end. An engaging miter gear 50 is affixed to a vertical shaft 51 journaled in the gear housing 48. Affixed to the shaft 51 is a sleeve 54 having a plurality of fan blades 55 affixed thereto. The fan structure is enclosed by a blower housing 56. Effluent ducts 57 and 58 are connected at one end to the housing and at the other end to rotary valve assemblies 59 and 60. Each valve assembly comprises a housing 61 and 62, shafts 63 and 64 rotatably mounted in the housings 61 and 62, as shown in greater detail in FIG. 4. The valve 59 is divided by radial walls 65 and 66 into into three chambers 67, 68 and 69. The valve 60, not shown, is similarly divided.

The valve sections having chambers 67 and 68 serve as intake valves while the valve section having the chamber 69 serves as an outlet valve. Each valve housing 61 and 62 is substantially cylindrical and is provided with ports comprising inlet and outlet ports, each port extending radially entirely between the walls of the valve housing and extending circumferentially over an arc of substantially 90°. The ports are positioned oppositely from each other. Sheet-form vanes 75 and 76 are mounted on the shaft 63 in the intake chambers 67 and 68, while vane 77 is mounted on the shaft 63 within the outlet chamber 69. The inlet valves are synchronized so that they are open at the same time and closed at the same time, remaining open for two quarters of each revolution and being closed for two quarters of each revolution. The outlet valve is so synchronized that it remains open when the intake valves are closed and closed when the intake valves are open. As a result the valves alternatively supply pressure or vacuum. As seen in FIGS. 3 and 4, the vanes 75 and 76 are preferably positioned so they are out of phase by a small amount. As a result, the intake and outlet valves are both closed for a small fraction of each cycle, thereby permitting a high air pressure to build up.

The valve assemblies 59 and 60 are connected to air distribution duct assemblies 78 and 79. One of the duct assemblies 78 is shown in detail in FIG. 4 and includes sheet-form diaphragms 80 and 81, cooperating with the duct housing to provide intake ducts 82 and 83 and a centrally located outlet duct 84. The structure of the air distribution duct assembly 79 on the other side of the apparatus is similar to that described with respect to the duct assembly 78. However, the valve assemblies 59 and 60 are synchronized so that they are exactly out of phase with each other. Consequently, when air pressure is applied to the duct assembly 78, air vacuum will be applied to the duct assembly 79, and vice versa.

The valve assemblies 59 and 60, as shown in detail in FIG. 2, are driven by means of a small gasoline engine 90 having its shaft 91 connected to a gear assembly 92 whereby it drives a shaft 93 positioned at right angles to the shaft 91 and mounted in journal bearing assemblies 94 and 95. Miter gears 96 and 97 are affixed at the ends of the shaft 93 and in turn drive miter gears 98 and 99 which are in turn affixed to the ends of the shafts 63 and 64.

A pair of disc-form or spherical sector-form baskets 100 and 101 are rotatably mounted on the frame and comprise a plurality of radial members or spokes 102 mounted in a hub 103 journaled on a spindle 104 having an enlarged retaining head 105. A brake or drag means is provided comprising discs 106 and 107 which are mounted over the shaft 104 of the hub, the disc 106 engaging the inner surface of the face-plate 108 of the hub 103 and the disc 107 engaging the surface of a washer 109 adjustably maintained in position by a pair of nuts 110 and 111. A helical compression spring 112 biases the discs 106 and 107 apart, thereby creating a braking or dragging force against the hub face plate 108, and between the face plate and the retaining head 105. The shaft 104 is affixed to a main shaft 113 which is mounted at its end in a bracket 114 mounted on a wall of the duct assemblies 78 and 79 by means of bolts 115 retained in arcuate slots 116 provided in a plate portion of the bracket 114. The structure is so designed that if immovable objects are encountered by the baskets 100 and 101, the baskets are free to swing outward and upward to avoid such obstacles.

The remaining structure of the baskets comprises peripheral arcuate rims connected at their ends to reverse arcuate rims 118 forming slots in the baskets, slots of the two baskets in registry cooperating to surround the bush or trunk therebetween. Although the rims 118 may be semi-circular or arcuate, the preferred form is that of a half tear drop as shown in the drawings. A fabric or net 127 is secured to the bottom of the frame including the radial members 102, and arcuate members 117, 117a and 118. The material of which the net is made should preferably be sufficiently soft or resilient so that the berries are not damaged as they fall thereinto. Suitable materials are cotton fabric, nylon fabric, and other fabrics or nets of natural or synethetic fibers.

As shown particularly in FIG. 3, the baskets are so designed that they overlap in order to prevent berries from falling therebetween. In order to retain the berries within the baskets, the reverse arcuate rims of both baskets should be made of a material such as strap metal or plastic and should have sufficient height to prevent a layer of berries from rolling thereover. The rims 117 of the upper basket need not be built up in this manner since the baskets are so designed that the berries from the upper basket roll into the lower basket, thereby permitting only a single conveyor system to be used. However, the rims 117a should also have substantial height in order to retain the berries until they are introduced to the conveying system.

The means for removing the picked berries from the baskets and conveying them to a suitable receptacle, as shown in FIGS. 1 and 2, comprises a small gasoline engine 119 connected to a blower 120 which forces air through a conduit 121. The conduit 121 is connected to a berry intake port 122 provided with baffles 123 so arranged that the passage of air through the conduit creates a vacuum and tends to suck the berries into the port. The conduit transports the berries to the rear of the apparatus, terminating in a proximal berry outlets 124 designed to permit the berries which are relatively heavy to fall therethrough, and a distal refuse outlet 125 designed to permit the lighter refuse to pass therethrough and to be discarded.

In operation, the blower engine 45, the valve operating engine 90, and the conveyor engine 119 are first started. The apparatus is drawn by suitable means such as a tractor, or, if desired, may be provided with its own propulsion power means. When a berry bush such as a blueberry bush is encountered by the machine which straddles the bush, the base of the bush enters the cooperating slots provided in the edges of the baskets. As the machine is drawn forward the baskets are caused to rotate slowly. When the bush is positioned between the air distribution duct assemblies, the operation of the blower and valve system causes a strong air pressure and air vacuum to be alternatively applied at each side of the apparatus, a vacuum being applied at one side while an air pressure is applied at the other. As a result, the bush and berries are vigorously shaken by the oscillating air blast, causing the berries to fall from the bush and to drop to the baskets below. Both the magnitude and frequency of the air blast may be adjusted so that only ripe berries which are retained less securely on the bush are removed, leaving those which are still green and which are more securely held remaining to be further ripened. As the apparatus moves forward, the baskets rotate slowly, the berries from the upper basket being gradually dumped into the lower basket. As the portions of the lower basket containing berries are raised to the elevation of the berry intake port of the conveyor system, they are dropped or sucked out of the basket and conveyed through the system, separated from debris and contaminants, and deposited into suitable containers.

The apparatus of the present invention has many advantages over prior art apparatus designed for the same purpose. The use of an oscillating air current removes the berries from the bushes very gently and without damaging them, in contrast to machines which use fingers or other mechanical devices for shaking the bushes or trees. The present machine is also much more gentle to the bushes or trees since no physical contact is involved. Consequently no damage results to the bushes and trees. Moreover, whereas prior art apparatus of the type described strip the bush substantially of all berries, the present apparatus may be so adjusted that only those berries which are ripe and therefore are less tenaciously held by the bushes, are removed, permitting unripe berries to remain on the bush and eventually to become ripe.

The present invention provides both air pressure and air vacuum alternately to each side of the bush which is picked. As a result, the pressure on one side combines with the vacuum on the other to provide an oscillating air blast which is substantially stronger than would result if only air pressure blasts were used. Further, the present rapidly operating valve arrangement enables the oscillating air blast to be maintained at a very high frequency, which frequency may be controlled and maintained with precision. In fact, the frequency may be controlled so that the natural period of vibrations of the berries while mounted on the bush may be taken advantage of and berries having a particular mass selectively picked while permitting other berries of smaller mass to remain on the bush. The apparatus is highly reliable over long periods of operation and is relatively simple and inexpensive to build when compared to prior art machines.

I claim:

1. An apparatus for picking berries or fruit comprising a frame having wheels mounted thereon and adapted to straddle bushes or trees bearing said berries or fruit, blower means mounted on said frame adapted to provide both air pressure and air vacuum, valve means connected to said blower means, and duct means connected at one end to said valve means and having the other end disposed at one side of said frame, said valve means causing air alternately to be forced into and to be withdrawn from the space within said frame in rapid sequence, thereby providing an oscillating air stream for dislodging said berries or fruit from said bush or tree.

2. An apparatus for picking berries growing on a bush comprising a frame defining a chamber and having wheels mounted at the ends thereof, said frame and wheels being arranged to straddle said bush, blower means mounted on said frame adapted to provide both air pressure and air vacuum, valve means associated with said blower means, and duct means connected at one end to said valve means and having the other end mounted in said frame at said chamber, said valve means alternately applying air pressure and air vacuum to said chamber, thereby providing an oscillating air stream for dislodging said berries from said bush.

3. An apparatus for picking berries growing on a bush, comprising a frame defining a chamber and having wheels mounted at the ends thereof, said frame and wheels being arranged to straddle said bush, blower means mounted on said frame having inlet and outlet adapted to provide both air pressure and air vacuum, a pair of valve means each having portions connected to said inlet and outlet, and a pair of duct means each having both air pressure and air vacuum ducts, the ducts of each duct means being connected at one end to one of said valve means and having the other end mounted in said frame, one of said duct means being positioned at each side of said chamber, each of said valve means causing air alternately to be forced into said chamber and to be withdrawn from said chamber in rapid sequence, both said valve means being so synchronized and positioned that when air is forced into said chamber on one side, air is withdrawn from said chamber on the other side, thereby providing an oscillating air stream for dislodging said berries from said bush.

4. An apparatus according to claim 3 wherein each valve means is divided into at least two valve assemblies, one connected to the outlet of said blower means and the other connected to the inlet thereof, each valve assembly comprising a cylindrical valve housing having inlet and outlet ports, a common shaft rotatably mounted at the axis of said valve housings and means for rotating said shaft, and a plate valve rotatably mounted in each valve housing and affixed to said common shaft, said plate valves and said ports being so positioned that the ports of one valve housing are closed when the ports of the other are open.

5. An apparatus according to claim 4 wherein each valve means is divided into three valve assemblies and each duct means comprises three ducts, one of said valve assemblies and one of said ducts being adapted to control air pressure and two of said valve assemblies and two of said ducts being adapted to control air vacuum.

6. An apparatus according to claim 4 wherein the valve assemblies of each valve means are arranged to be out of phase to a small degree, whereby all the ports of said valve means are closed for a short period of time immediately before said air pressure ports are opened, thereby permitting a high air pressure to build up within said blower means immediately prior to release of said air pressure.

7. An apparatus according to claim 1 having means for catching said dislodged berries and means for conveying said berries to a suitable receptacle.

8. An apparatus according to claim 7 wherein said means for catching said berries comprises a pair of disc-form baskets rotatably mounted about substantially vertical axes.

9. An apparatus according to claim 7 wherein said means for catching said berries comprises a pair of disc-form baskets rotatably mounted about axes inclined from the vertical at an acute angle and convering upwardly, each of said baskets comprising a circular frame having a fabric affixed thereto, the peripheral portions of said baskets overlapping each other, and slot means provided at spaced intervals in the perhiphery of each basket, the slots of said baskets being adapted to be placed in registry with each other to encircle the base of said bush.

10. An apparatus according to claim 7 wherein said means for conveying said berries comprises a duct having a berry receptacle and discharge port, and means for blowing air through said duct.

References Cited

UNITED STATES PATENTS

| 1,137,545 | 4/1915 | Shaffer | 56—30 |
| 2,427,155 | 9/1947 | Nisbet | 56—30 X |
| 2,660,021 | 11/1953 | McDowell | 56—330 |
| 2,763,978 | 9/1956 | Graham et al. | 56—30 |
| 3,006,131 | 10/1961 | McDowell | 56—330 |
| 3,114,998 | 12/1963 | Weisser | 56—329 |
| 3,276,194 | 10/1966 | Mohn | 56—330 |

ALDRICH F. MEDBERY, Primary Examiner.

U.S. Cl. X.R.

56—30, 12